Nov. 24, 1970   E. L. BARCUS ET AL   3,543,018
REARVIEW MIRROR WITH MAP LIGHT
Filed Aug. 6, 1968   2 Sheets-Sheet 1
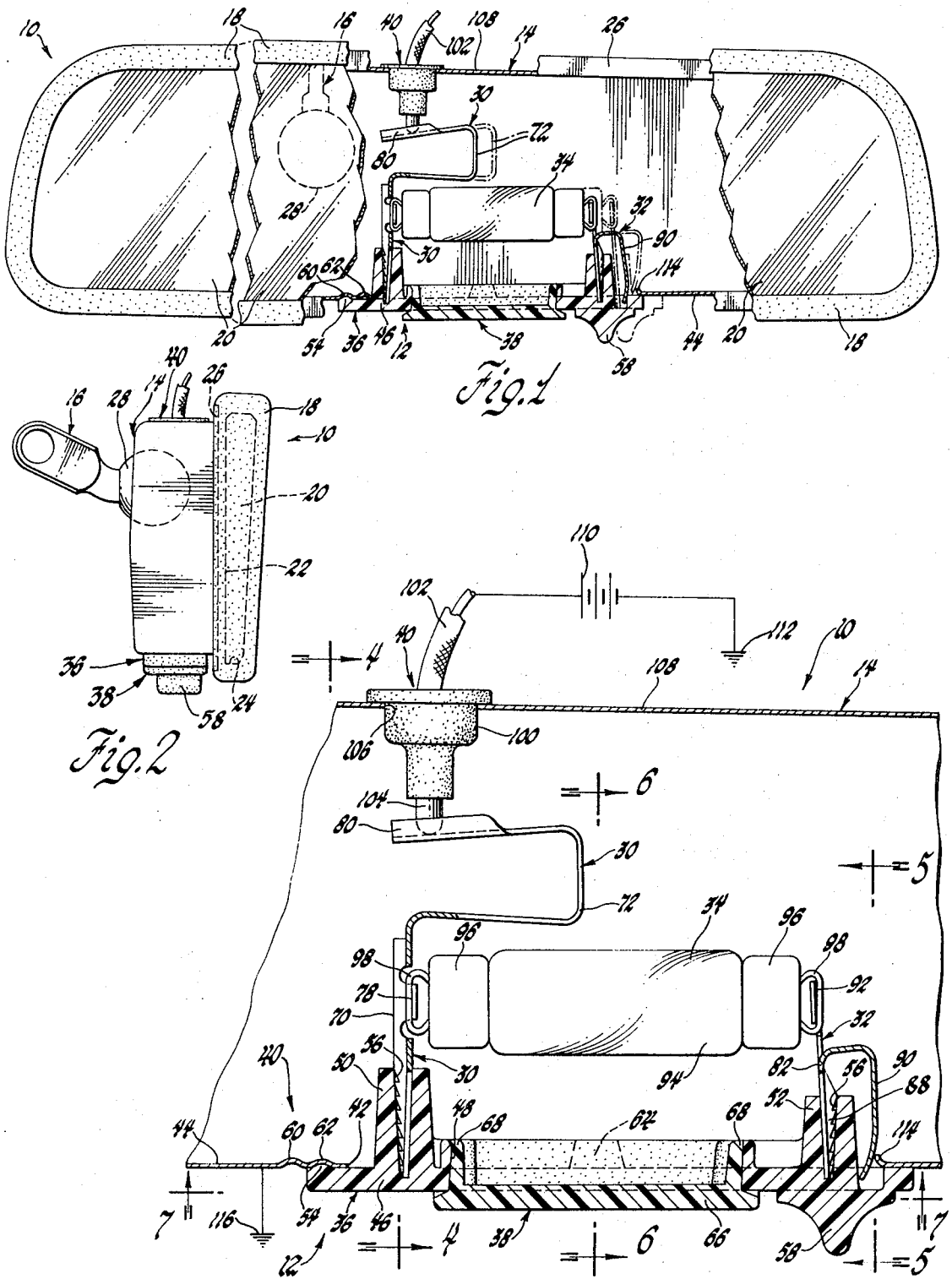
INVENTORS
Edward L. Barcus &
BY David P. Clayton
E. J. Biskup
ATTORNEY

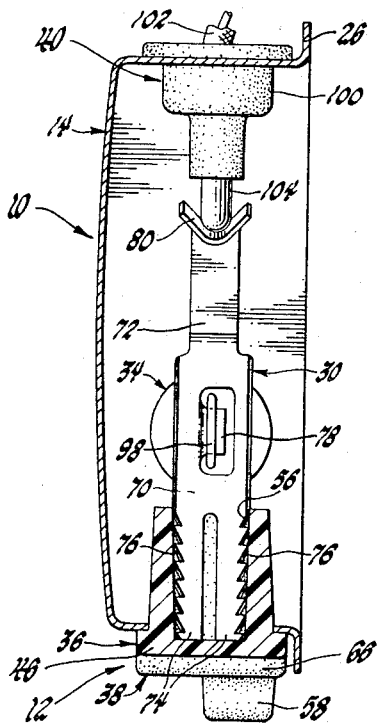
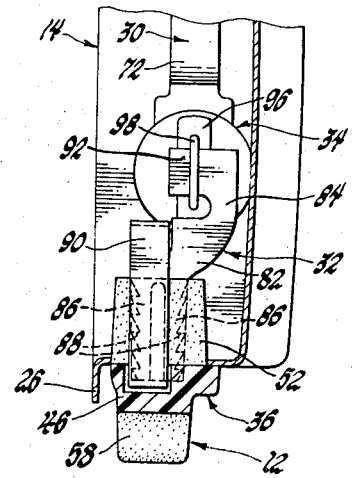
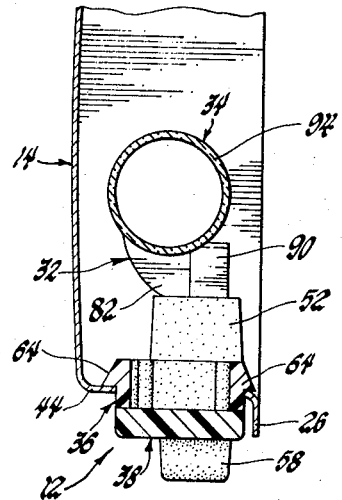
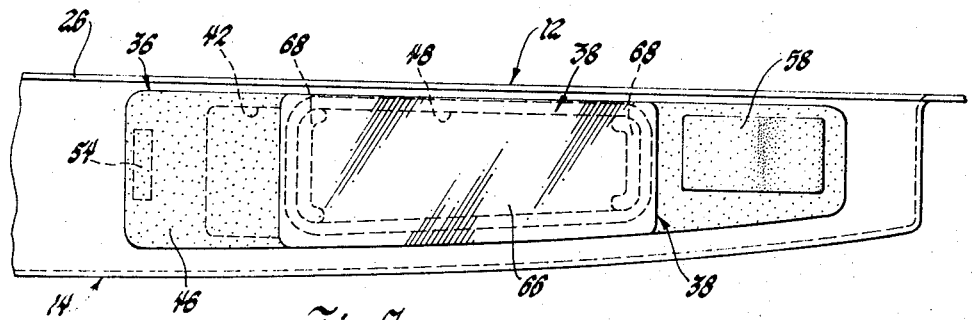

United States Patent Office 3,543,018
Patented Nov. 24, 1970

3,543,018
REARVIEW MIRROR WITH MAP LIGHT
Edward L. Barcus and David P. Clayton, Anderson, Ind., assignors to General Motors Corporation, Detroit, Mich., a corporation of Delaware
Filed Aug. 6, 1968, Ser. No. 750,504
Int. Cl. B60g 3/02; F21v 33/00
U.S. Cl. 240—4.2                                                  6 Claims

ABSTRACT OF THE DISCLOSURE

A rearview mirror for use in a motor vehicle wherein a lamp assembly is received within a slot formed in the bottom surface of the mirror housing and is slidable therewithin between detented "on" and "off" positions. A light source is spring mounted between two mounting clip contacts, one of which slidingly contacts a conductor that is connected to an electrical power source and the other of which includes a resilient grounding finger that engages the side of the housing in the "on" position to form a ground connection therebetween and thereby illuminate the light source. Illumination is directed outwardly of the housing through a lens mounted in the lamp assembly.

---

In the past, the instrument panels of motor vehicles have been provided with a rearwardly projecting ledge. A lamp assembly or map light is usually installed at the undersurface of the ledge for providing a secondary source of interior illumination to supplement the interior dome light. The lamp assembly is operated by a switch or in response to an opening of a vehicle door. However, the recent trend in interior vehicle styling toward a substantially vertical instrument panel surface has partially eliminated the aforementioned ledge and thereby the convenient location for the map light. In these instances, it has been proposed that the lamp assembly be incorporated on the inerior rear view mirror. However, these proposals have not been entirely satisfactory inasmuch as an independent lighting unit must be attached exterior of the standard rear view mirror or a non-standard housing must be provided for a mirror incorporating the desired lamp assembly. Moreover, these devices usually require a manually operable two-position switch for selectively illuminating and extinguishing the light source. The switch requires internal electrical wiring for connecting the light source to the electrical power source. Thus, the additional parts and operations required to produce rear view mirrors of the above described construction greatly increases the cost thereof and limits acceptance of these mirrors either as a standard or an accessary item.

The present invention, on the other hand, provides a lamp assembly readily adaptable for use with conventional rearview mirrors. The lamp assembly is insertable as a unit within an opening formed on the bottom wall of the mirror housing and as such requires only minimal alterations to the ordinary housing. The lamp assembly is slidable along the wall between detented electrically "on" and "off" positions thereby eliminating the need of an independent switch. A pair of mounting clips are attached to the body of the lamp assembly and, in addition to forming the mounting means for a light source, also serve as electrical contacts for the latter. One of the mounting clips slidingly electrically engages a conductor that is connected to an electrical power source thereby eliminating the need for internal wiring. The other mounting clip includes a resilient grounding finger that is normally spaced from the housing in the "off" position. When the lamp assembly is shifted to the "on" position, the grounding finger engages the electrically conductive housing and an electrical circuit is completed through the conductor, the mounting clips and the light source that illuminates the latter to direct illumination outwardly into the vehicle interior through a lens mounted within the lamp body.

Accordingly, the objects of the present invention are: to provide a lamp assembly that is insertable as a unit within an electrically conductive housing and which cooperates with the latter to selectively illuminate and extinguish an associated light source; to provide a lens-operated lamp assembly and switch wherein a lamp body including a pair of electrical contacts and a light source is insertable within an opening formed in the lamp housing and is movable between detented positions to selectively illuminate or extinguish the light source; to provide a rearview mirror including a light source for illuminating the interior of a motor vehicle wherein a combination lens-switch-light source lamp assembly is slidingly received within an aperture formed in the bottom surface of an electrically conductive mirror housing, the lamp assembly including two resilient mounting clips that serve to complete a circuit from an electrical power source to the light source when the lamp assembly is in one of two detented positions; and to provide a rearview mirror having a manually operable light source for illuminating the interior of a motor vehicle wherein a lamp assembly including a lens, a pair of electrical contacts and a light source is inserted as a unit within an aperture formed in an electrically conductive mirror housing and is slidable therewithin, the light source being illuminated when a grounding finger on one of the contacts engages the housing in one position to form a ground connection therebetween and complete the electrical circuit from a source of electrical power connected to the other contact.

These and other objects will be apparent to one skilled in the art upon reading the following detailed description, reference being made to the accompanying drawings in which:

FIG. 1 is a front view partially in section and partially broken away showing a lamp assembly made in accordance with the present invention incorporated in a rearview mirror;

FIG. 2 is a side elevational view of the rearview mirror shown in FIG. 1;

FIG. 3 is an enlarged cross-sectional view of the lamp assembly shown in FIG. 1;

FIG. 4 is a view taken along line 4—4 in FIG. 3;

FIG. 5 is a view taken along line 5—5 in FIG. 3;

FIG. 6 is a view taken along line 6—6 in FIG. 3; and

FIG. 7 is a view taken along line 7—7 in FIG. 3.

Referring to FIG. 1, there is shown a rearview mirror 10 incorporating a lamp assembly 12 made in accordance with the present invention. As shown in FIG. 2, the rearview mirror 10 more specifically comprises a generally dish-shaped metallic housing 14, a support stud 16, a shroud 18 and a mirror element 20 having a reflective surface 22. The mirror element 20 is peripherally and rearwardly retained within a forwardly opening recess 24 formed in the shroud 18. The mirror housing 14 frontally terminates with an outwardly turned peripheral flange 26 that is adhesively bonded to the rear surface of the shroud 18. The support stud 16 includes a spherical end 28 that is conventionally adjustably connected to a complementally formed socket (not shown) attached within the lamp housing 14. The other end of the support stud 16 is adapted to be connected to a suitable mirror support of the type customarily located within a motor vehicle adjacent the upper portion of the windshield.

Referring to FIG. 1, the lamp assembly 12 more specifically comprises a pair of mounting clips 30, 32, a light source 34, a lamp body 36 and a translucent lens 38. A conductor assembly 40 cooperates with the lamp assembly 12 in a manner to be hereafter described to selectively illuminate the light source 34. The lamp assembly 12 is insertable as a unit within an elongated opening generally indicated by the reference numeral 42 formed in the lower wall 44 of the lamp housing 14. As will be explained in greater detail below, the lamp assembly 12 is shiftable within the opening 42 and along the lower wall 44 between electrically "on" and "off" positions, the "off" position being illustrated in FIG. 1 and the "on" position being illustrated in FIG. 3.

Referring jointly to FIGS. 3 and 7, the lamp body 36 has a generally rectangular base 46 having a centrally located opening 48 formed therein. A pair of upwardly projecting bosses 50 and 52 and a transversely extending rib 54 are formed on the upper surface of the base 46. An upwardly opening recess 56 is formed in each boss 50 and 52 for receiving the lower ends of mounting clips 30 and 32. A downwardly projecting shifting knob 58 is formed on the bottom surface of the base 46 adjacent one end thereoof. In assembly, the rib 54 is selectively detentable between a pair of depressions 60 and 62 formed in the lower wall 44 of the lamp housing 14. As shown in FIG. 6 the lamp body 36 further includes a pair of deflectable shouldered tabs 64 formed at the upper surface of the base 46 intermediate of and adjacent to the opening 48. Referring to FIGS. 3 and 7, the lens 38 is formed of a translucent plastic material and includes a generally rectangular base 66 and a pair of upwardly extending arms 68. The base 66 may include surface optics for controlling the distribution of illumination from the light source 34.

Referring to FIG. 3, the mounting clip 30 is formed of a suitably electrically conductive material and comprises a bow-shaped downwardly extending leg 70 and a generally U-shaped flex section 72. As shown in FIG. 4, the lower end of the leg 70 is slotted to form a pair of spaced sections 74 having sawtoothed projections 76 formed at the sides thereof. An inwardly turned mounting ear 78 is formed in the leg 70 for mounting one end of the light source 34. The upper end of the flex section 72 terminates with a generally V-shaped channel 80.

Referring to FIG. 5, the mounting clip 32 is formed of an electrically conductive material and comprises a downwardly extending bow-shaped leg 82 and a generally C-shaped head section 84 laterally offset therefrom. The lower end of the leg 82 is slotted to form a pair of spaced sections 86 having sawtoothed projections 88 formed at the sides thereof. The upper end of the leg 82 terminates with a reversely bent downwardly depending grounding finger 90. The upper end of the head section 84 is formed with an inwardly turned mounting ear 92 for mounting the other end of the light source 34.

The light source 34 is a commercially available model having a cylindrical glass envelope 94 and sealed ends 96. A generally line source filament is located within and substantially coextensive with the envelope 94. The filament includes hooked terminals 98 which are sealed within and extend outwardly from the ends 96.

The conductor assembly 40 comprises a grommet 100 and a conductor 102 having a terminal end 104. The grommet 100 is formed of an insulating material and is adapted to be press-fitted within an aperture 106 formed in the top wall 108 of the mirror housing 14. The other end of the conductor 102 is electrically connected to a suitable electrical power source 110, such as a battery, and to a ground connection 112.

As previously mentioned, the lamp assembly 12 is assembled as a unit prior to installation. More specifically, referring to FIG. 4, the mounting clip 30 is secured to the lamp body 36 by pressing the leg 70 downwardly within the recess 56. The sections 74 deflect inwardly and the projections 76 slide downwardly over the inwardly facing surface by the recess 56. In assembly, the projections 76 become partially embedded in the surface and withdrawal of the mounting clip 30 from the boss 50 is prevented by the sawtoothed configuration.

Similarly, as shown in FIG. 5, the mounting clip 32 is secured to the lamp body 36 by pressing the sections 86 downwardly to the illustrated position wherein the projections 88 are partially embedded in the surface of the recess 56.

To mount the light source 34, the mounting clips 30 and 32 are inwardly deflected and the terminals 98 are hooked over the mounting ears 78 and 92. Thus, it will be appreciated that the light source 34 is resiliently held and electrically connected between the mounting clips 30 and 32.

The lens 38 is secured to the lamp body 36 by pressing the arms 68 upwardly within the opening 48 to the locked position shown in FIG. 3 wherein the base 66 abuts the bottom surface of the base 46.

The lamp assembly 12, in the aforedescribed assembled relation, is inserted upwardly through the opening 42. As the tabs 64 engage the surface of the opening 42, the inclined surfaces of the former deflect inwardly thereby accommodating continued upward movement of the lamp assembly 12. After the tabs 64 pass above the opening 42, the internal elastic forces of the lamp body material urge the tabs 64 outwardly and the lamp assembly 12 assumes a securely assembled position wherein the tabs 64 and the base 46 slidably engage the spaced surfaces of the bottom wall 44. In this connection, it should be noted that the lens 38 may be mounted to the lamp body 36 after the lamp assembly 12 is inserted within the housing 14 without departing from the above described unitized construction.

The connector assembly 40 is attached to the mirror 10 by pressing the grommet 100 within the aperture 106. In final assembly and with the lamp assembly in either the "on" or "off" position, the terminal 104 electrically engages and downwardly biases the channel 80. The terminal 104 slides along the channel 80 as the lamp assembly 12 is shifted between the aforementioned positions thereby maintaining a continuous sliding electrical connection therebetween.

In operation, when it is desired to illuminate the light source 34, the operator grasps the knob 58 and shifts the lamp body 36 to the position illustrated in FIG. 3 wherein the rib 54 is engaged with the depression 62. In this position, the grounding finger 90 resiliently engages an upturned edge 114 formed adjacent the opening 42 to form a ground connection 116 with the mirror housing 14 thereby completing an electrical circuit with the power source 110 and illuminating the light source 34. Accordingly, illumination is directed outward of the housing 14 through the lens 38. When it is desired to extinguish the light source 34, the lamp body 36 is shifted to the position shown in FIG. 1 wherein the rib 54 is detented within depression 60. In this position, the grounding finger 90 is spaced from the edge 114 thereby interrupting flow of current through the light source 34 and extinguishing the latter.

Although only one form of this invention has been shown and described, other forms will be readily apparent to those skilled in the art. Therefore, it is not intended to limit the scope of this invention by the embodiment selected for the purpose of this disclosure but only by the claims which follow.

What is claimed is:

1. A lamp unit, comprising: an electrically conductive housing having an aperture formed therein; a lamp body including a transparent lens, said lamp body received within said aperture and movable therealong between a first and a second position; first and second contacts carried by said lamp body within said housing, said second contact cooperating with said housing in said first position to form a ground connection therebetween; conductor means for electrically connecting said first contact to an electrical power source in said first position; and a light source mounted within said housing and electrically connected between said first and second contacts whereby said light source is illuminated and light is directed outwardly of said housing through said transparent lens when said lamp body is in said first position and said light source is extinguished when said lamp body is moved to said second position.

2. A lamp unit, comprising: an electrically conductive housing having an aperture formed therein; a lamp body including a translucent lens received within said aperture and selectively movable between a first and a second position; first and second electrically conductive mounting means attached to said lamp body and located within said housing, said second mounting means including a resilient finger engaging said housing in said first position for electrically grounding the former, said finger spaced from said housing in said second position; a conductor adapted to be connected to an electrical power source mounted within the housing and insulated from the latter, said conductor slidably engaging said first mounting means to form an electrical connection therebetween; and a light source mounted between and having terminals electrically connected to said first and second mounting means, said light source being illuminated when said lamp body is in said first position whereby light is directed outwardly of said housing through said translucent lens and being extinguished when said lamp body is shifted to said second position.

3. A lamp unit, comprising: a metallic housing having an aperture formed therein; a lamp body formed of an insulating material received within said aperture and selectively slidable between detented positions; a lens mounted within said lamp body; first and second contacts mounted in spaced relationship on said lamp body within said housing, said second contact having a resilient finger engageable with said housing when said lamp body is in a first detented position thereby forming a ground connection therebetween, said resilient finger disengaged from said housing when said lamp body is in a second detented position; conductor means insulated from the housing continuously slidably engaging the first contact for electrically connecting the latter to an electrical power source; a light source mounted within said housing and aligned with said lens, said light source having terminals electrically connected to said first and second contacts whereby said light source is illuminated and light is directed outwardly of said housing through said lens when said lamp body is in a first detented position and said light source is extinguished when said lamp body is shifted to said second detented position.

4. A rear view mirror for a motor vehicle, comprising: an electrically conductive housing in which there is positioned a mirror element having a reflective surface, said housing having an aperture in a lower wall thereof; support means for adjustably mounting said housing within said vehicle; a lamp body received within said aperture and selectively movable along the surface of said lower wall between two positions; a lens mounted within said lamp body; a pair of electrically conductive mounting clips attached to said lamp body and located within said housing; conductor means electrically connected to one of said mounting clips and insulated from said housing, said conductor means adapted to be connected to a source of electrical power; grounding means electrically connected to the other of said mounting clips, said grounding means engaging said housing when said lamp body is in one of said positions to establish a ground connection between said housing and said other of said mounting clips and spaced from said housing when said lamp body is in the other of said positions; and a light source electrically connected between said mounting clips, said light source being illuminated when said lamp body is in said one of said positions whereby light is directed outwardly of said housing through said lens, said light source being extinguished as said lamp body is shifted to said other of said positions.

5. A rear view mirror including a lamp assembly for directing illumination within the interior of a motor vehicle, comprising: an electrically conductive housing in which there is positioned a mirror element having a reflective surface; support means for adjustably mounting said housing within the interior of the vehicle; an elongated opening formed in a lower surface of the housing; a lamp body received within said opening and selectively movable along said surface between two positions; a lens mounted within said lamp body; a pair of electrically conductive resilient mounting clips attached to said lamp body and located within said housing, one of said mounting clips including a resilient finger engageable with said housing in one of said positions to form a ground connection therebetween and spaced from said housing when said lamp body is in the other of said positions; conductor means electrically connected to the other of said mounting clips and insulated from said housing, said conductor means adapted to be connected to a source of electrical power; and a light source electrically connected and resiliently mounted between said mounting clips whereby said light source is illuminated when said lamp body is in said one of said positions and illumination is directed outwardly of said housing through said lens and said light source is extinguished when said lamp body is in said other of said positions.

6. A rear view mirror for a motor vehicle, comprising: an electrically conductive housing in which there is positioned a mirror element having a reflective surface; support means for adjustably mounting said housing within said vehicle; an elongated opening formed in a lower wall of said housing; a lamp body received within said opening and selectively detentable along the surface of said lower wall between two positions; a lens mounted within said lamp body; a pair of electrically conductive resilient mounting clips attached to said lamp body and located within said housing, one of said mounting clips including a resilient finger engageable with said housing in one of said positions to form a ground connection therebetween and spaced from said housing when said lamp body is in the other of said positions, the other of said mounting clips including a resilient end portion; a conductor insulated from said housing and electrically connected to and slidingly engaging said end portion of said one of said mounting clips; means for electrically connecting said conductor to a source of electrical power; and a light source resiliently mounted and electrically connected between said mounting clips, said light source being illuminated when said lamp body is in said one of said positions whereby light is directed outwardly of said housing through said lens, said light source being extinguished as said lamp body is shifted to said other of said positions.

References Cited

UNITED STATES PATENTS

| | | | |
|---|---|---|---|
| 2,268,189 | 12/1941 | Colbert | 240—7.1 XR |
| 2,641,684 | 6/1953 | Dillon | 240—7.1 |
| 2,673,914 | 3/1954 | Sundt. | |
| 2,996,608 | 8/1961 | Clayton | 240—7.35 |
| 3,211,903 | 10/1965 | McElreath | 240—7.1 XR |

NORTON ANSHER, Primary Examiner

J. F. PETERS, JR., Assistant Examiner

U.S. Cl. X.R.
240—2, 7.1, 151